United States Patent Office 2,710,811
Patented June 14, 1955

2,710,811

STABILIZED PIGMENTED CELLULOSE ACETATE-BUTYRATE MOLDING COMPOSITIONS CONTAINING PARA-TERTIARY-BUTYL PHENOL

George C. De Croes and John W. Tamblyn, Kingsport, Tenn., assignors to Eastman Kodak Company, Rochester, N. Y., a corporation of New Jersey No Drawing. Application September 15, 1952, Serial No. 309,741

5 Claims. (Cl. 106—189)

This invention relates to cellulose acetate-butyrate molding compositions, and more particularly to compositions of this nature which are suitable for outdoor use. It is known that the weathering encountered in outdoor use has a deleterious effect on plastics. Addition of certain pigments and/or of antioxidants to the plastic compositions has been known to prolong their life under outdoor conditions to some extent, but in the case of light-colored pigments the improvement obtained was not outstanding, even when an antioxidant was also added. Some pigments even catalyze the deterioration.

We have found certain combinations of pigment and antioxidant which have a synergistic effect, prolonging the outdoor life of cellulose acetate-butyrate compositions far beyond what could be expected from the individual effects of the pigment and the antioxidant. Two of the pigments which are desirable in cellulose acetate-butyrate plastics for outdoor use are the anatase form of titanium dioxide, and aluminum powder. Titanium dioxide of the anatase form gives a white plastic which is useful in plastic tire covers and as a protective coating on metal tubing for hand railings and lawn furniture, the coating being extruded onto the tubing. An aluminum-filled cellulose acetate-butyrate plastic makes a pleasing appearance and remains cool to the touch in the sun, but cannot be used outdoors without some added protection. We have found that a combination of p-tertiary butyl phenol and a pigment selected from the group consisting of aluminum powder and the anatase form of titanium dioxide prolongs to a surprising extent the resistance to weathering of cellulose acetate-butyrate molding compositions.

In testing the cellulose acetate-butyrate molded compositions, compression-molded samples, 2.5" x 0.5" x 0.050", from a rolled composition consisting of 100 parts of cellulose acetate-butyrate (37% butyryl; 13% acetyl), 12 parts of dibutyl sebacate and the indicated parts of p-tertiary-butyl phenol and/or pigment were exposed at 60° C. in a modified Atlas Twin-Arc Weather-Ometer set on the 51 min.: 9 min. dry: wet cycle with the sample drum revolving once a minute. The modification of the Weather-Ometer consisted in the addition of 8 Westinghouse 20-watt fluorescent sun lamps, mounted vertically at a distance of about 2 inches from the sample drum. This modification of the Weather-Ometer was described in detail in a paper by J. W. Tamblyn and G. M. Armstrong, entitled "A Modification of the Atlas Twin-Arc Weather-Ometer," presented March 31, 1952, before the Division of Paint, Varnish, and Plastics Chemistry of the American Chemical Society, at a national meeting in Milwaukee, Wisconsin, and published in Anal. Chem. 25, 460–5 (1953). Inherent viscosities were measured in acetone solutions at a concentration of 0.23 g. per 100 cc. Brittleness was defined as a break at bend angles of less than 90° when the piece was bent in the Tour-Marshall test for stiffness in flexure (A. S. T. M. D747–43T). The flexural strength was calculated from data obtained by the aforesaid Tour-Marshall test. The following table illustrates the results obtained. In the table, the abbreviation "pt." stands for parts per 100 parts of cellulose acetate-butyrate, by weight.

| Antioxidant | Pigment | Original Color of Plastic | Color After Exposure | Hours' Exposure Required for— | | |
|---|---|---|---|---|---|---|
| | | | | 25% Loss in Flexural Strength | 25% Loss in Inherent Viscosity | Development of Brittleness |
| None | None | Water clear | Water clear | 150 | 160 | 150 |
| 1 pt. p-tert.-butyl phenol | do | do | do | 350 | 500 | 350 |
| None | 2 pt. anatase $TiO_2$ | White | White | 550 | 1,300 | 400 |
| Do | 4 pt. aluminum powder | Silver | Silver | 650 | 700 | 650 |
| 1 pt. p-tert.-butyl phenol | 2 pt. anatase $TiO_2$ | White | White | 2,500 | >3,300 | 2,200 |
| Do | 4 pt. aluminum powder | Silver | Silver | >3,000 | >3,000 | >3,000 |

The very great improvement brought about by the combination of specific pigment and specific antioxidant is evident from the table. The specific plasticizer used in the example forms no part of our invention. Similar results may be obtained with cellulose acetate-butyrate plastics in which other known plasticizers therefor are used. The butyryl and acetyl contents of the cellulose acetate-butyrate may also be varied. The proportions of pigment and antioxidant with relation to each other and to the cellulose acetate-butyrate may also be varied.

What we claim as our invention and desire to be secured by Letters Patent of the United States is:

1. A cellulose acetate-butyrate molding composition stabilized against weathering by a content of p-tertiary-butyl phenol and a pigment selected from the group consisting of aluminum powder and the anatase form of titanium dioxide.

2. A cellulose acetate-butyrate molding composition stabilized against weathering by a content of p-tertiary-butyl phenol and aluminum powder.

3. A cellulose acetate-butyrate molding composition stabilized against weathering by a content of p-tertiary-butyl phenol and the anatase form of titanium dioxide pigment.

4. A cellulose acetate-butyrate molding composition stabilized against weathering by a content of approximately 1 part of p-tertiary-butyl phenol and 4 parts of aluminum powder per 100 parts of cellulose acetate-butyrate, by weight.

5. A cellulose acetate-butyrate molding composition stabilized against weathering by a content of approximately 1 part of p-tertiary-butyl phenol and 2 parts of the anatase form of titanium dioxide pigment per 100 parts of cellulose acetate-butyrate, by weight.

References Cited in the file of this patent

UNITED STATES PATENTS

| | | |
|---|---|---|
| 2,048,248 | Dreyfus | July 21, 1936 |
| 2,372,980 | Pliech | Apr. 3, 1945 |
| 2,407,209 | Swan et al. | Sept. 3, 1946 |
| 2,535,357 | Gloor | Dec. 26, 1950 |
| 2,558,047 | Gloor | June 26, 1951 |